US008246451B2

(12) United States Patent
Pitman et al.

(10) Patent No.: US 8,246,451 B2
(45) Date of Patent: Aug. 21, 2012

(54) CELEBRATION PAY

(75) Inventors: Lawrence R. Pitman, Corvallis, OR (US); Michael B. Shelby, Corvallis, OR (US)

(73) Assignee: IGT, a Nevada Corporation, Reno, NV (US)

( * ) Notice: Subject to any disclaimer, the term of this patent is extended or adjusted under 35 U.S.C. 154(b) by 822 days.

(21) Appl. No.: 10/894,339

(22) Filed: Jul. 20, 2004

(65) Prior Publication Data

US 2005/0054430 A1 Mar. 10, 2005

Related U.S. Application Data

(60) Provisional application No. 60/489,471, filed on Jul. 22, 2003.

(51) Int. Cl.
*A63F 13/10* (2006.01)

(52) U.S. Cl. ................. 463/26; 463/25; 463/27; 463/42

(58) Field of Classification Search .............. 463/16–22, 463/25–28, 42
See application file for complete search history.

(56) References Cited

U.S. PATENT DOCUMENTS 5,116,055 A * 5/1992 Tracy .............................. 463/27
5,280,909 A * 1/1994 Tracy .............................. 463/27
5,611,730 A 3/1997 Weiss
5,836,817 A 11/1998 Acres et al.
5,941,773 A * 8/1999 Harlick ........................... 463/26
6,071,190 A 6/2000 Weiss et al.
6,077,172 A 6/2000 Butler ........................... 473/305
6,146,273 A * 11/2000 Olsen .............................. 463/27
6,312,333 B1 11/2001 Acres et al.
6,319,125 B1 11/2001 Acres .............................. 463/25
6,358,149 B1 * 3/2002 Schneider et al. .............. 463/27
6,416,409 B1 * 7/2002 Jordan ............................ 463/27
6,554,283 B2 * 4/2003 Vancura et al. ............... 273/292
6,554,710 B1 * 4/2003 Olson ............................. 463/42
6,620,046 B2 * 9/2003 Rowe .............................. 463/25
6,634,946 B1 * 10/2003 Bridgeman et al. ............ 463/28
7,056,215 B1 * 6/2006 Olive .............................. 463/27
7,172,508 B2 * 2/2007 Simon et al. .................... 463/42
2001/0031661 A1 * 10/2001 Wiltshire et al. ............... 463/26
2002/0028706 A1 * 3/2002 Barnard et al. ................. 463/26
2003/0013521 A1 1/2003 Cole et al.
2003/0027638 A1 2/2003 Schneider et al.
2003/0148807 A1 * 8/2003 Acres .............................. 463/26

FOREIGN PATENT DOCUMENTS

WO WO 03/083797 A1 10/2003

* cited by examiner

*Primary Examiner* — Peter DungBa Vo
*Assistant Examiner* — Damon Pierce
(74) *Attorney, Agent, or Firm* — Clise, Billion & Cyr, P.A.; Richard E. Billion

(57) ABSTRACT

Players are selected to celebrate the win. A portion of the bonus pool is divided among the celebrating players. The amount to be received by each player can be verified to meet minimum and maximum amount requirements. The celebration pay is delivered to the gaming machines used by the celebrating players.

12 Claims, 8 Drawing Sheets

CELEBRATION PAY

RELATED APPLICATION DATA

This application claims priority from U.S. Provisional Patent Application Ser. No. 60/489,471, filed Jul. 22, 2003, which is incorporated by reference. This application incorporates by reference U.S. patent application Ser. No. 08/843,411, filed Apr. 15, 1997, now U.S. Pat. No. 6,319,125, issued Nov. 20, 2001, and U.S. patent application Ser. No. 08/322,172, filed Oct. 12, 1994, now U.S. Pat. No. 5,655,961, issued Aug. 12, 1997.

FIELD OF THE INVENTION

This invention pertains to gaming devices, and more particularly to making payouts to non-winning machines.

BACKGROUND OF THE INVENTION

When gambling as an industry was in its infancy, the lure of the possibility of winning big money was enough to attract players. Casinos as envisioned today were a concept yet to be considered, gaming machines were relatively sparse, and the expense of travel (both financially and temporally) limited players' options.

The growth shown by Las Vegas, Nev., Atlantic City, N.J., and other gambling hot spots, the variety of different gaming devices, and the ability to travel long distances quickly and cheaply have conspired to change the player's perception of the industry. There are near-infinite variations of gaming devices, and the increasing number of casinos provides players with many choices as to where to spend their time (and money).

To entice players to play the gaming devices, many casinos now offer bonuses. The bonuses entice players because they offer the chance to increase the amount of a jackpot beyond that listed on the given machine, or an opportunity to win a separate bonus in parallel. A player might be more interested in playing a machine if he has the chance to win a payout, even if not hitting a winning combination for that machine.

But even where bonuses are offered, the bonuses are limited. One player wins the bonus, and all other players are left to consider what might have been.

Embodiments of the invention address these problems and others in the art.

SUMMARY OF THE INVENTION

The invention is an apparatus, system, and method enabling players to celebrate when a bonus is won. A network connected gaming devices. A first selector selects a winning gaming device, and a second selector selects celebration devices. A transmitter transmits to each of the celebration devices a message, instructing the celebration device to award the player a portion of the bonus pool.

The foregoing and other features, objects, and advantages of the invention will become more readily apparent from the following detailed description, which proceeds with reference to the accompanying drawings.

DETAILED DESCRIPTION

Figure 1:
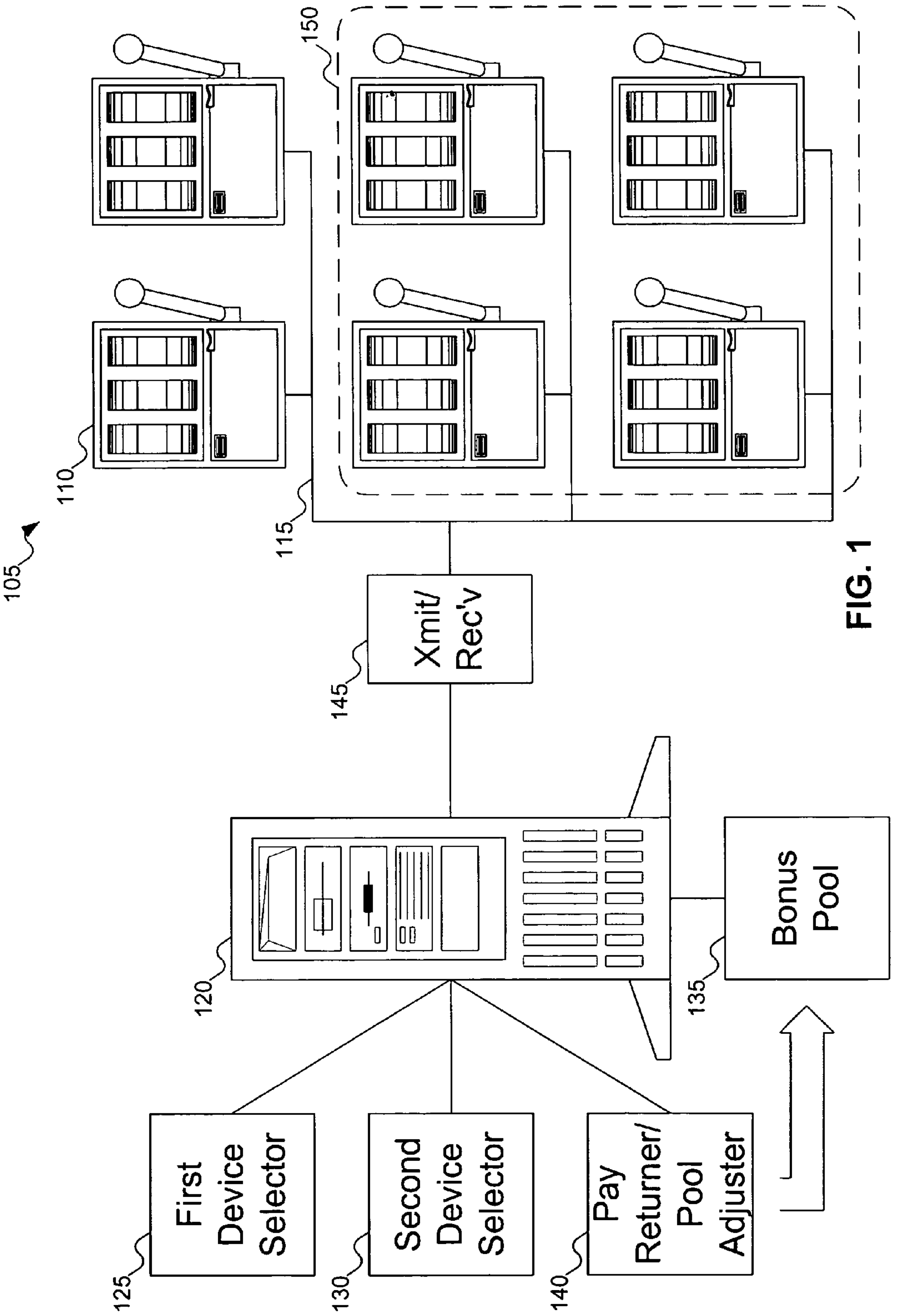
FIG. 1 shows gaming devices connected to a bonus controller, according to an embodiment of the invention.

FIG. 1 shows gaming devices connected to a bonus controller, according to an embodiment of the invention. In FIG. 1, many gaming devices 105 (sometimes called gaming machines) are shown. For example, gaming device 110 is one of gaming devices 105. The gaming devices are all interconnected by network 115. Although FIG. 1 shows all of gaming devices 105 interconnected by the same network, a person skilled in the art will recognize that there can be different networks connecting different groups of gaming devices.

Also connected to network 105 is bonus controller 120. At a high level, bonus controller 120 is responsible for managing celebration payouts. (The term "celebration pay" is similar to, although broader than, the term "consolation pay" as used in U.S. patent application Ser. No. 08/843,411, filed Apr. 15, 1997, now U.S. Pat. No. 6,319,125, issued Nov. 20, 2001, incorporated by reference herein.) Bonus controller 120 includes first selector 125, second selector 130, bonus pool 135, pay returner 140, and transmitter/receiver 145. First selector 125 is responsible for selecting the winning gaming device, according to the rules for the bonus promotion. Second selector 130 is responsible for selecting non-winning gaming devices that are to participate in the celebration. Although FIG. 1 shows first selector 125 and second selector 130 as separate components of bonus controller 120, a person skilled in the art will recognize that their functions can be combined into a single selector.

Bonus pool 135 is the source of the funds distributed to the winning player and to the celebration players. Note that bonus pool 135 is not used to distribute funds payable according to the rules of individual gaming devices 105: bonus pool 135 is used only for bonuses that are independent of the individual gaming devices. Bonus controller 120 adds to bonus pool 135 as players play. The bonus pool is started with an initial pool value. After that, a potion of each coin in increases the bonus pool size. The accrual rate is configurable: typical values are between 0.01% and 5% of all coin in is used to fund the bonus pool. A person skilled in the art will recognize that smaller or larger accrual rates are permitted, and that celebration pay can be funded from sources other than the bonus pool used to pay the winner of the bonus promotion. For example, two bonus pools can be funded: one for the primary winner and one for celebration winners.

Pay returner 140 is responsible for returning undistributed portions of bonus pool 135. As will be discussed below with reference to FIGS. 4A-4B, it can happen that some of the funds distributed by bonus controller 120 as celebration pay to the individual gaming machines is not awarded to the players. In that case, the funds can be returned to bonus pool 135, using pay returner 140. Pay returner 140 can return any unused funds to bonus pool 135 in different ways. For example, pay returner 140 can return the unused funds to bonus pool 135 as soon as bonus controller 120 is notified that specific gaming machines did not use the funds. Or, pay returner 140 can wait until all gaming machines have reported what they paid, and then any unused funds can be returned to bonus pool 135 in one operation. Or, pay returner 140 can trickle unused funds back into bonus pool 135 slowly over time (to avoid a fast change in the funds in bonus pool 135).

Or, pay returner 140 can direct the unused funds to other uses, and not return the unused funds to bonus pool 135 at all. A person skilled in the art will recognize other ways in which pay returner 140 can return funds to bonus pool 135.

Pay returner 140 is also used to adjust the funds in bonus pool 135. As will be discussed later with reference to FIGS. 3A-3D and 4A-4B, it can happen that the total amount paid out as celebration pay exceeds the amount distributed as celebration pay by bonus controller 120. In that case, pay returner 140 can be used to adjust the balance in bonus pool 135 to account for the overpayment. As with unused funds, pay returner 140 can adjust bonus pool 135 in one step or gradually over time. Typically, pay returner 140 adjusts bonus pool 135 over time to avoid sudden drops in the balance of bonus pool 135, and to account for the possibility that the overpayment might cause bonus pool 135 to have a negative balance.

Finally, transmitter/receiver 145 is responsible for managing communications between bonus controller 120 and gaming devices 105. This is typically accomplished via messaging: bonus controller 120 transmits messages to and receives messages from gaming devices 120. These messages can be anything pertinent to the operation of bonus controller 120: for example, the messages can relate to player eligibility, selecting a winning player, or delivering a payout to a gaming device. A person skilled in the art will recognize other messages that can be transmitted or received using transmitter/receiver 145.

Although FIG. 1 shows transmitter/receiver 145 as a single component, a person skilled in the art will recognize that this is not necessary. That is, it is possible to have one component of bonus controller 120 responsible for transmitting, and a separate component of bonus controller 120 responsible for receiving.

FIG. 1 also shows a subset of gaming machines 105 grouped into venue 150. A venue can be any type of organizational structure. Venues can be as small as two machines or as large as many casinos. Typically, a venue will be a single casino, although occasionally a venue might be a room within the casino. Typically, all the machines within a given venue are physically near to each other (for example, side-by-side or back-to-back), but a person skilled in the art will recognize that the machines might be scattered in physically disparate locations. Essentially, a venue can be any grouping of machines, whether logically organized or not, either within a casino or spread across multiple casinos.

Each venue can include at least one bank controller (not shown in FIG. 1). If included, the bank controller is responsible for managing the normal operations of the gaming machines in the venue. Venues can have more than one bank controller, but typically bank controllers do not control gaming machines in more than one venue. The bank controller acts as a gateway, passing messages to the gaming machines. If the functionality of the bank controller is offered elsewhere (for example, in the bonus controller discussed below), the bank controller can be eliminated.

Typically, a single bonus controller manages celebration pay for all venues, but a person skilled in the art will recognize that there can be multiple bonus controllers. If there are multiple bonus controllers, then if the bonus controllers are to share celebration payouts the bonus controllers must communicate with each other. If two bonus controllers have a common venue, then the bonus controllers should work cooperatively and communicate with each other. (Of course, if the bonus controllers are each independent in operation and share no common venues, they need not communicate.)

As mentioned above, bonus controller 120 is responsible for determining which gaming device(s) has won a promotion, how large a celebration pay amount is to be awarded, and for communicating this information to the gaming devices (typically via bank controllers). Typically, only gaming machines in the same venue as the winning machine are eligible for celebration pay, but a person skilled in the art will recognize that this is not required. There are several ways in which bonus controller 120 can determine the gaming machines to make celebration payouts. In one embodiment, bonus controller 120 has a list of machines in each venue. When bonus controller 120 decides which gaming machine(s) has won a promotion, the venue can be determined by locating the list(s) including the winning gaming machine(s). (In this embodiment, bank controllers are not needed to identify the venue of the winning gaming machine(s).) In another embodiment, the venue of each gaming machine is encoded as part of the ID of the gaming machines, so that when a gaming machine(s) is selected as winning a promotion, the venue is easily determined. In yet another embodiment, the venue of the winning gaming machine(s) can be determined from the unique location ID assigned to the gaming machine, from which the appropriate bank controller(s) and all other machines in the same venue can be determined.

In one embodiment, once the venue of the winning gaming machine(s) has been identified, bonus controller 120 broadcasts a message to the gaming machines in the venue. The broadcast informs the gaming machines that a promotion has been won, and that prizes can be awarded. The broadcast can include, for example, the criteria the gaming machines are to use to decide (individually) whether their players qualify for a payout, and the prizes that can be received. (The actual decision whether or not to award a prize to the player is then made by the gaming machine.) But a person skilled in the art will recognize that other embodiments are possible. For example, bonus controller 120 can decide which gaming machines are to award what prizes, and send the gaming machines individual messages, indicating what they should award (and sending no message to gaming machines not selected to make awards). For example, if a player needs to meet some criteria before receiving an award (such as having an account in a player tracking database, or having a sufficient level of gaming activity), bonus controller 120 can determine which gaming machines have players that meet the criteria, and alert only those gaming machines to give an award.

Celebration pay is applicable to any promotion. For example, celebration pay can be used with the promotions shown in Table 1, among others. With promotions that typically operate only for individuals (such as Welcome Back, Match Play, and Personal Progressive), a person skilled in the art will recognize how the promotions can be adapted to offer celebration pay. For example, when one player wins a personal Progressive prize, other gaming machines can celebrate, even though the other gaming machines could not win the bonus from the individual's bonus pool.

TABLE 1

| Promotion | Description |
|---|---|
| Cash Bonus | A payout bonus value is selected. When the bonus pool reaches the selected payout bonus value, an eligible gaming machine is chosen, and the player of the selected gaming machine receives the payout bonus value. |
| Unpredictable Bonus | A threshold value is chosen. When the bonus pool reaches the threshold value, the gaming machine that caused the bonus pool to reach or exceed the threshold value receives a prize. |
| Multiple Bonus | Similar to the Unpredictable Bonus, several threshold values are chosen, each with a different, typically escalating (in terms of value) prize. When the bonus pool reaches each of the threshold values, the gaming machines that caused the bonus pool to reach or exceed the threshold values receive the corresponding prize. |
| Progressive Jackpot | A bonus pool is accumulated as play occurs. Eventually, some external event triggers a win (e.g., a player hitting a particular reel combination). The winning player receives an award from the bonus pool. |
| Linked Progressive | Similar to the Progressive Jackpot, but the amount awarded is linked to the wager of the player: if the player wagers more, the award is larger. |
| Multiple Jackpot | At some point, a bonus session begins. Jackpots on selected gaming machines are multiplied by constant values for the duration of the bonus session. |
| Welcome Back | When a player reaches a certain level of activity, the player is awarded with a future (i.e., not immediate), finite period of reduced-cost wagering. |
| Match Play | The player accumulates points while playing. The points can be converted (at some ratio) to discounts for non-gaming uses, or to credits for gaming. |
| Personal Progressive | Similar to the Progressive Jackpot, the Personal Progressive operates only for individuals. Several threshold values are chosen, each with a different, typically escalating (in terms of value) prize. When the individual's bonus pool reaches each of the threshold values, the individual receive the corresponding prize. |
| Individual Multiple Jackpot | Similar to the Multiple Jackpot, at some point a bonus session begins. Jackpots on the individual's gaming machine are multiplied by constant values for the duration of the bonus session. |

In one embodiment, a celebration prize is paid to eligible gaming machines when a bonus is paid to a single winner, and not when the promotion can include multiple simultaneous winners. In this embodiment, promotions, such as Multiple Jackpot and Match Play do not include celebration pay.

Although certain promotions are described as using specific triggers (for example, the Cash Bonus promotion uses as the trigger the bonus pool reaching a threshold value), a person skilled in the art will recognize that other triggers can easily by substituted. For example, the Cash Bonus promotion can use as a trigger the arrival a randomly selected time. In addition, although the promotions described above (with the primary exception of Welcome Back) typically pay to the player immediately, a person skilled in the art will recognize how payout timing can be adapted. Table 2 shows a list of trigger possibilities and payout possibilities, which can be used in any desired combination.

TABLE 2

| Trigger | Payout Timing and Conditions |
|---|---|
| Specific Game Outcome | Pay immediate |
| Sets of Game Outcomes | Pay next day |
| Consecutive Game Outcomes | Pay next visit |
| X Outcomes in Y Tries | Pay after x hours |
| Outcome Sets Per Unit Time | Pay at given location |
| Outcomes Relative to Others | Pay after playing x |
| Points Earned | Pay at set time |
| Win/Loss Per Unit Time | Pay on other game |
| Visit Frequency | Pay all "eligible" |
| Handle Per Trip | Pay only max coin players |
| Handle Per Unit Time | Pay only x coins per line players |
| Continuous Play | Pay only players wagering a minimum amount |
| Bonus Pool Threshold Value | |
| Pre-Selected Clock Time/Delay | |
| Electronic Drawing | |
| Casino Discretion | |

Figure 2:
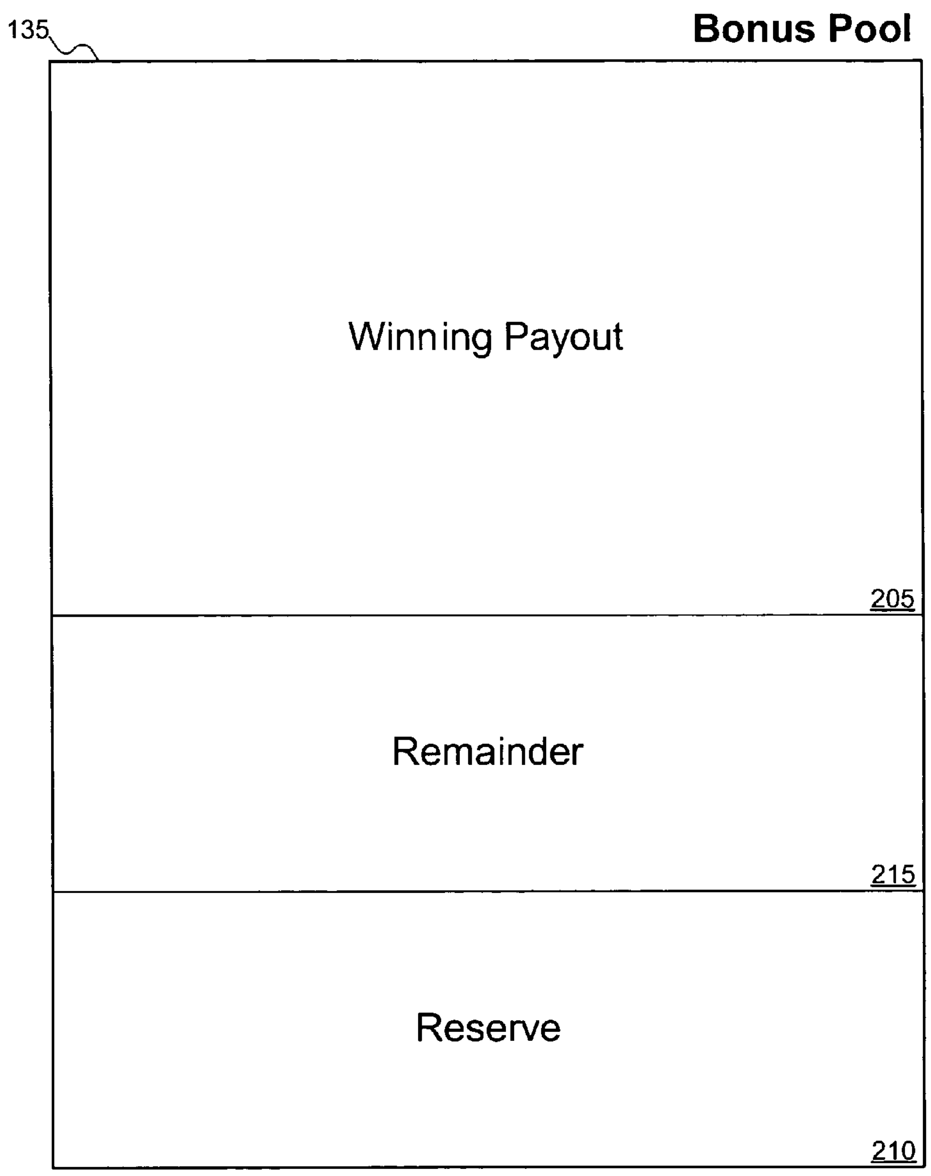
FIG. 2 shows the structure of the bonus pool of FIG. 1, according to an embodiment of the invention.

For each promotion, when a winner is determined (by the bonus controller), a portion of the bonus pool is paid to the winner. The portion paid to the winner can be fixed in amount, or it can be a percentage of the bonus pool. The bonus controller then determines how much remains in the bonus pool. A portion of the bonus pool is reserved so that the bonus pool retains a minimum amount. The remainder of the bonus pool (after paying the winner and reserving a minimum amount for the bonus pool) is to be paid as celebration pay. FIG. 2 shows this structure. The top portion of bonus pool 135 is allocated as winning payout 205 for the promotion. The bottom portion of bonus pool 135 is kept as reserve 210, used as a starting point in rebuilding bonus pool 135. The middle portion is remainder 215, which is allocated as the celebration pay. The percentage of bonus pool 135 allocated to each of winning payout 205, reserve 210, and remainder 215 can be set in any desired manner (with the obvious caveats that no portion should be allocated a negative percentage of bonus pool 135).

Returning to FIG. 1, once the gaming machines that can participate in the celebration pay have been determined, second selector 130 can select the eligible gaming machines. Although celebration pay can be implemented to include every gaming machine in the venue, typically the celebration pay is limited to only certain gaming machines. One way to determine eligible machines is to select all gaming machines being used by carded players where the game was last played some maximum amount of time (e.g., 15-30 seconds) before the winning machine was selected. But a person skilled in the art that other conditions (and condition combinations) can be used to select the eligible gaming machines. For example, the eligible gaming machines might be those gaming machines where the last bet just before the winning machine was selected was a maximum bet.

Once second selector 130 has selected the eligible gaming machines, bonus controller 120 determines the celebration amount to be paid to each eligible gaming machine. The celebration amount (sometimes called celebration pay) is the amount remaining in the bonus pool (after paying the winning machine and reserving a minimum amount for the bonus pool: that is, remainder 215 of FIG. 2) divided by the number of eligible gaming machines.

After determining the celebration amount for each gaming machine, bonus controller 120 checks the celebration amount against minimum and/or maximum threshold amounts, which are independently configurable. If the celebration amount is below a minimum threshold amount (which can occur if too many gaming machines are eligible to celebrate or the allocation to the remainder of bonus pool 135 is too small), then the celebration is skipped. Only the winning machine is paid; the remainder of the bonus pool is added to the reserve. This avoids the system having to pay out numerous small awards. Similarly, if there are relatively few eligible machines, or if the remainder allocation is too large, the celebration amount might exceed a maximum threshold amount. In this case, the celebration amount is adjusted down to the maximum threshold amount, and the excess is added to the reserve. A person skilled in the art will recognize that other conditions can be set upon the celebration pay. For example, the system can require a minimum number of eligible celebrants, without regard to the specific amounts to be paid. A person skilled in the art will also recognize that the minimum and maximum threshold amounts can be configured separately for different promotions. That is, the minimum and maximum threshold amounts can differ from promotion to promotion.

Once bonus controller 120 has calculated the celebration amount and verified that the celebration amount is in the acceptable range, each eligible gaming machine is notified of the celebration amount. Bonus controller 120 uses transmitter/receiver to accomplish this notification. The eligible gaming machines are responsible for informing the player of the celebration amount (e.g., with flashing lights, sounds, or a displayed message), paying the celebration amount to the player, and informing the bonus controller as to whether (and how much of) the celebration pay was awarded. For example, if the celebration pay was in an amount of $10.00 and was properly awarded, the gaming machine can send a message to the bonus controller that $10.00 was paid as celebration pay.

In another embodiment, celebration pay can be awarded without any related promotion. For example, at some time (either determined in advance or selected at random), a random celebration amount can be selected. Typically, the random celebration amount is between a minimum and maximum amount. A person skilled in the art will recognize that the minimum amount can be zero (in which case, if the randomly selected celebration amount is zero, no celebration pay is awarded at all). A person skilled in the art will recognize that the maximum amount can be omitted: that is, the randomly selected celebration amount can be unlimited. A person skilled in the art will also recognize that the minimum and maximum amounts can be tuned to the particular venue. For example, a venue including gaming devices that only take nickels might use a zero minimum amount and a low maximum amount (e.g., $5.00), whereas a venue including higher cost gaming machines might include higher minimum and maximum amounts.

Once the celebration amount is determined, the number of eligible gaming machines is determined. If the number of eligible gaming machines, multiplied by the randomly selected celebration amount, is less than the remainder in the bonus pool (for this embodiment, the winning amount can be $0), then the eligible gaming machines are paid the randomly selected celebration amount.

In one variation of this embodiment, the system checks to see if the amount to be paid (the number of eligible gaming machines multiplied by the randomly selected celebration amount) is less than the remainder of the bonus pool only once. In another embodiment, if the amount that would be paid exceeds the remainder of the bonus pool, then the system waits until the number of eligible gaming machines drops. When the number of eligible gaming machines drops sufficiently that the remainder of the bonus pool can pay the amount, then the celebration pay is awarded.

One use for this embodiment is to encourage play at times when casino activity is generally low: for example, in the late evening and early morning hours. During the day, even though the celebration pay system might be operating, the number of eligible gaming machines would probably be high, meaning a low likelihood that the celebration amount would be awarded. But at hours of low activity, because the number of players is typically lower, players would be more likely to win the celebration award. This would encourage players to play a little later into the evening, to increase their chances of winning an award. For venues with low cost machines, the celebration pay can be awarded throughout the day, because the amounts are generally smaller.

Another use for this embodiment is to encourage play on higher cost machines. If the range of possible celebration amounts is wider, then the players can win more. Note that the range of possible celebration amounts can be wider not only so that the payout can be more in absolute terms, but also in plays on the machine. For example, as discussed above, the range of celebration amounts for venues including a nickel machine might be $0.00 to $5.00. $5.00 would buy 100 plays on a nickel machine. But for a $1.00 machine, the range of possible celebration amounts might be $5.00 to $500.00. $500.00 would give a player 500 plays on the $1.00 machine, enticing players to the more expensive machine.

Celebration pay can be awarded in different ways. Celebration pay can be paid in coin to the player, as an ordinary jackpot. Or, celebration pay can be awarded to the player as a credit on the machine. In this variation, the player can use the celebration award to play the gaming machine, but does not have the option to receive the celebration award as coin (although the player can receive as coin any winnings from plays with the credit). The credit can be transferable to a player's account, or it can be used only on the gaming machine at the time the credit was awarded. A person skilled in the art will recognize other possible ways to award the celebration pay.

There are a couple of reasons why the eligible gaming machine might not pay the celebration amount. Typically, the amount is not paid automatically. The player must take some action (e.g., press a button) to receive the celebration amount. If the player does not take the appropriate action within a certain amount of time (for example three minutes), the eligible gaming machine withdraws the celebration announcement (the eligible gaming machine can also inform the player that the celebration is no longer available). The gaming machine then notifies bonus controller 120 that the celebration pay was not awarded, typically by sending a message that the gaming machine paid out $0.00 as celebration pay to the player. Indicating a zero payment makes it possible for the bonus controller to detect problems with the gaming machine: if the gaming machine sends no message to the bonus controller, bonus controller 120 knows that there is a problem.

Another reason the eligible gaming machine might return the celebration amount to the bonus controller is if the gaming machine is no longer eligible. It takes a finite (although small) amount of time for the bonus controller to perform its steps. It might happen that, after the bonus controller determines which gaming machines are eligible but before the gaming machine receives the message from the bonus controller, the gaming machine is no longer eligible. For example, if eligibility is contingent on the player having inserted his player tracking card in the gaming machine, but the player has withdrawn his card from the card reader, then the gaming machine is no longer eligible. The gaming machines themselves are the final arbiters as to whether or not they are eligible for the celebration pay; and if an individual gaming machine decides that it is not eligible, the celebration amount is returned to the bonus pool.

It is worth noting that, like celebration players, bonus controller 120 sends the winning machine a message, so that the player can be notified of the win. In a manner similar to the celebration amounts, the winning machine notifies the player and waits for him or her to take action to receive the winning amount. But unlike the celebration amounts, if the player does not accept the promotion within a certain amount of time (for example, five minutes), the amount is not returned to the bonus pool. Instead, accounting is notified that the player did not accept the award. The accounting department can then manage the funds that the player did not receive. Typically, they will attempt to notify the player by other means, but the winning amount can also be returned slowly to the bonus pool, so that it does fill the bonus pool too fast. A person skilled in the art will recognize other ways in which the winning amount can be used. (The player might not receive the winning amount for any number of reasons. For example, the player might have stepped away from the machine for a moment, or been distracted, and the notice of the win timed out before the player returned.)

While bonus controller 120 is responsible for determining the celebration amount, it can happen that the calculated celebration amount is not an amount that the gaming machine can easily pay. For example, a venue might include gaming machines with $1.00 and $5.00 denomination bets. If the bonus controller broadcasts that the celebration pay amount is $7.35, gaming machines that have $1.00 denomination bets might round the celebration amount down to $7.00 (since these machines cannot pay amounts smaller than $1.00), whereas the gaming machines that have $5.00 denomination bets might round the celebration amount down to $5.00. The individual gaming machines are permitted to adjust the celebration amount to an acceptable amount, and inform bonus controller 120 of the variations in the celebration amount when they report the amount paid.

Although the above example shows the gaming machines adjusting the celebration amounts down, a person skilled in the art will recognize that the gaming machines can also adjust the celebration amounts up. For example, if the celebration amount were $3.35 and only rounding down were permitted, gaming machines with $1.00 denomination bets would pay celebration awards ($3.00), but gaming machines with $5.00 denomination bets would pay nothing. To reward players using the more expensive machines, the $5.00 denomination gaming machines could round the celebration award up to $5.00. (This might result in a celebration overpayment, which would result an adjustment to future celebration awards, as mentioned earlier.)

The above description suggests that bonus controller 120 only performs a rough computation of the celebration amount, and leaves fine tuning to the individual gaming machines. While this implementation is certainly acceptable, bonus controller 120 is capable of calculating a celebration amount that can be paid by all eligible gaming machines without adjustment. To calculate such a celebration amount, bonus controller 120 needs to know the minimum denominations of all gaming machines in the venue(s) over which the celebration amount is to be paid. Then, after roughly computing the celebration amount, bonus controller 120 can adjust the celebration amount to an amount that can be paid by all gaming machines. For example, if there were three eligible machines and $10 to divide amongst the three, bonus controller 120 would calculate the celebration amount as $3.33 if the smallest payable denomination were $0.01, and $0.01 return to the bonus pool. But if the smallest payable denomination were $1.00, then bonus controller 120 would calculate the celebration amount as $3.00, and $1.00 would be returned to the bonus pool.

To let players know about the current status of the bonus pool, an overhead display can be used. The overhead display shows the current value of the bonus pool, although it does not indicate to players when the bonus pool will be distributed. For example, consider the situation where the trigger for a promotion is a Lucky Coin. In a Lucky Coin promotion, a value is selected for the bonus pool (typically randomly). When that value is reached, the gaming machine that caused the bonus pool to exceed the value is the winner of the promotion. (It may occur that the bonus controller cannot identify a particular machine that should be identified as a winner, but rather narrow down the list of potential winners to a subset of the gaming machines. For example, the bonus controller can receive messages from the gaming machines at essentially fixed time intervals. If the bonus controller receives, say, messages from five gaming machines, which cumulatively cause the bonus pool to exceed the predetermined value, the bonus controller cannot determine exactly which machine was responsible for the bonus pool exceeding the predetermined value. In that case, the bonus controller can select any one of the potential winners randomly.) The overhead display would show the current amount in the bonus pool that can be won. The overhead display can also show the current amount or current percentage of the bonus pool that would be won by a player if someone won the current promotion at this time, or the amount the player will win (if the promotion includes a fixed winning amount). The overhead display than acts as a marketing tool, to attract players.

The overhead display can also display other information, which can be of use to players and/or staff of the casino. For example, the overhead display can show the winner of the most recent promotion, along with his or her location. The overhead display can also show what the celebration amount was for the most recent promotion. A person skilled in the art will recognize other information that can be displayed on the overhead display. Because keeping information on the overhead display relating to a past promotion typically does not serve marketing goals, information about past winners is eventually cycled off the display: for example, five minutes after the player won the promotion.

Figure 3A:
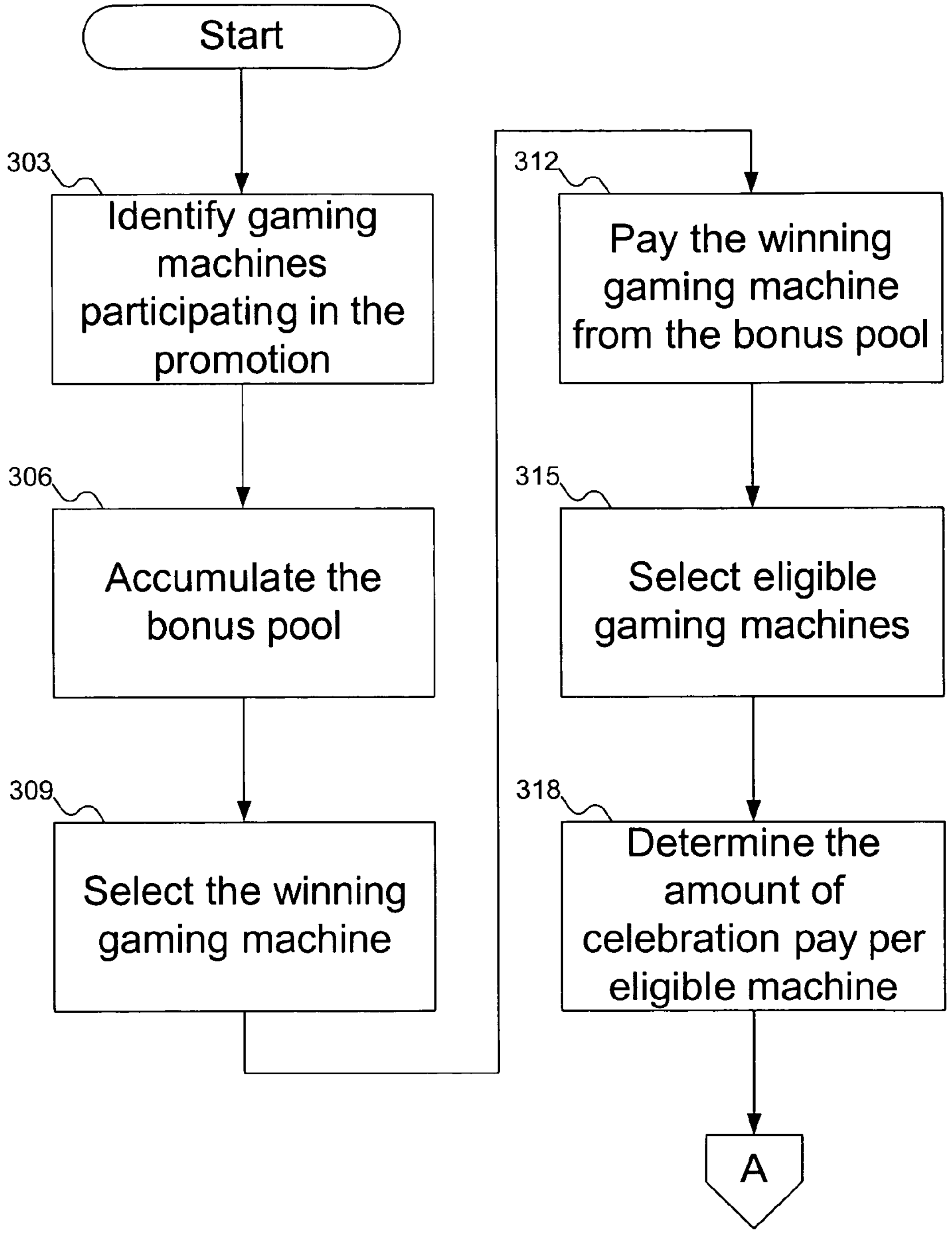
FIGS. 3A-3D show a flowchart of the operation of the bonus controller of FIG. 3 to award celebration pay, according to an embodiment of the invention.
Figure 3B:
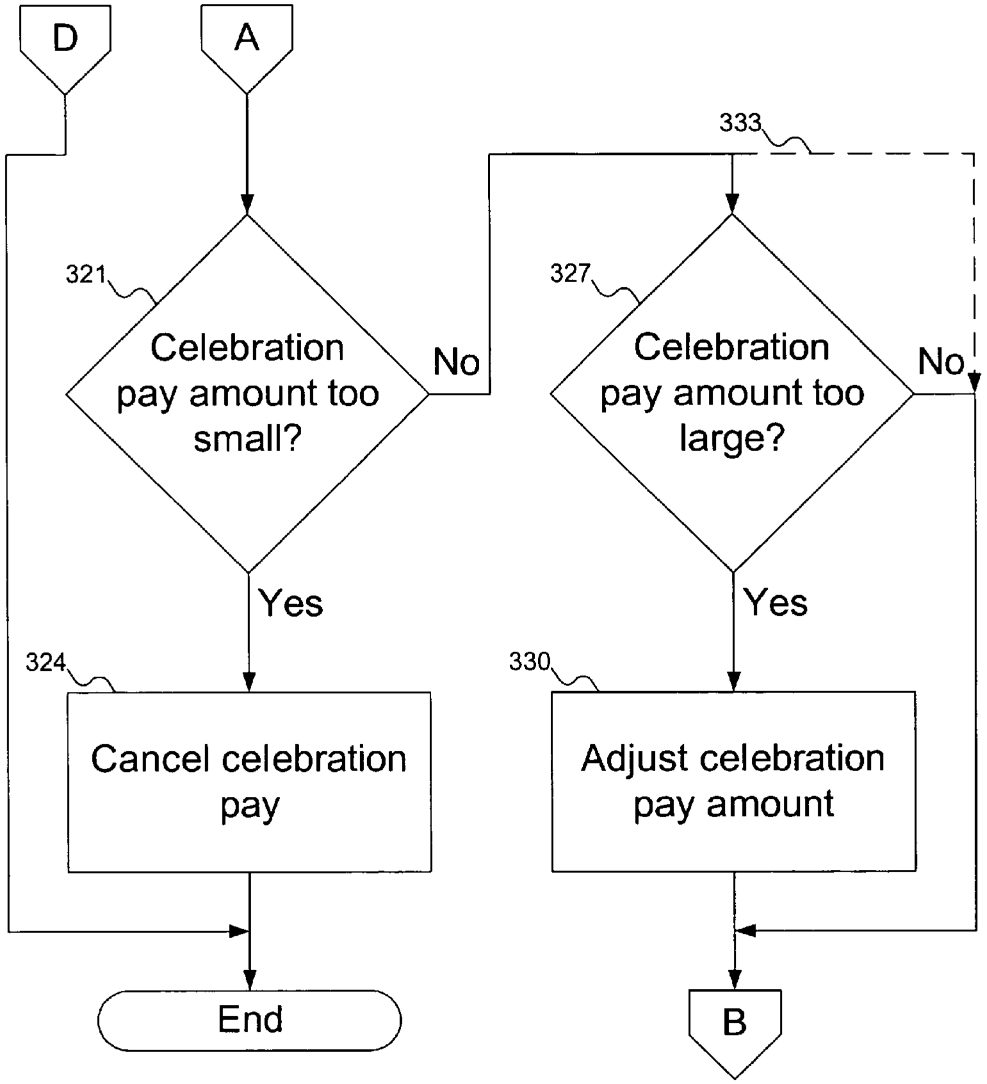
Figure 3C:
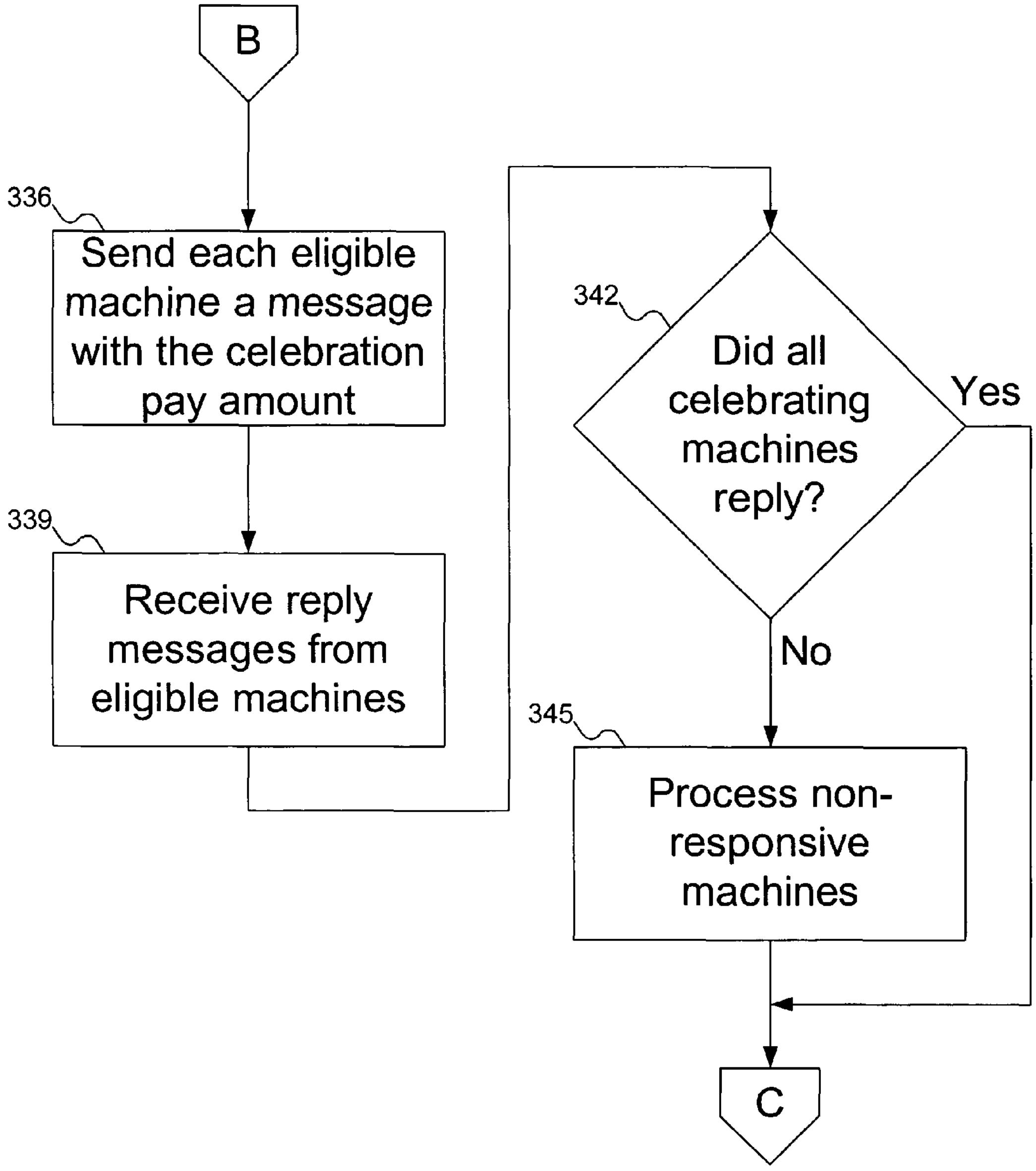
Figure 3D:
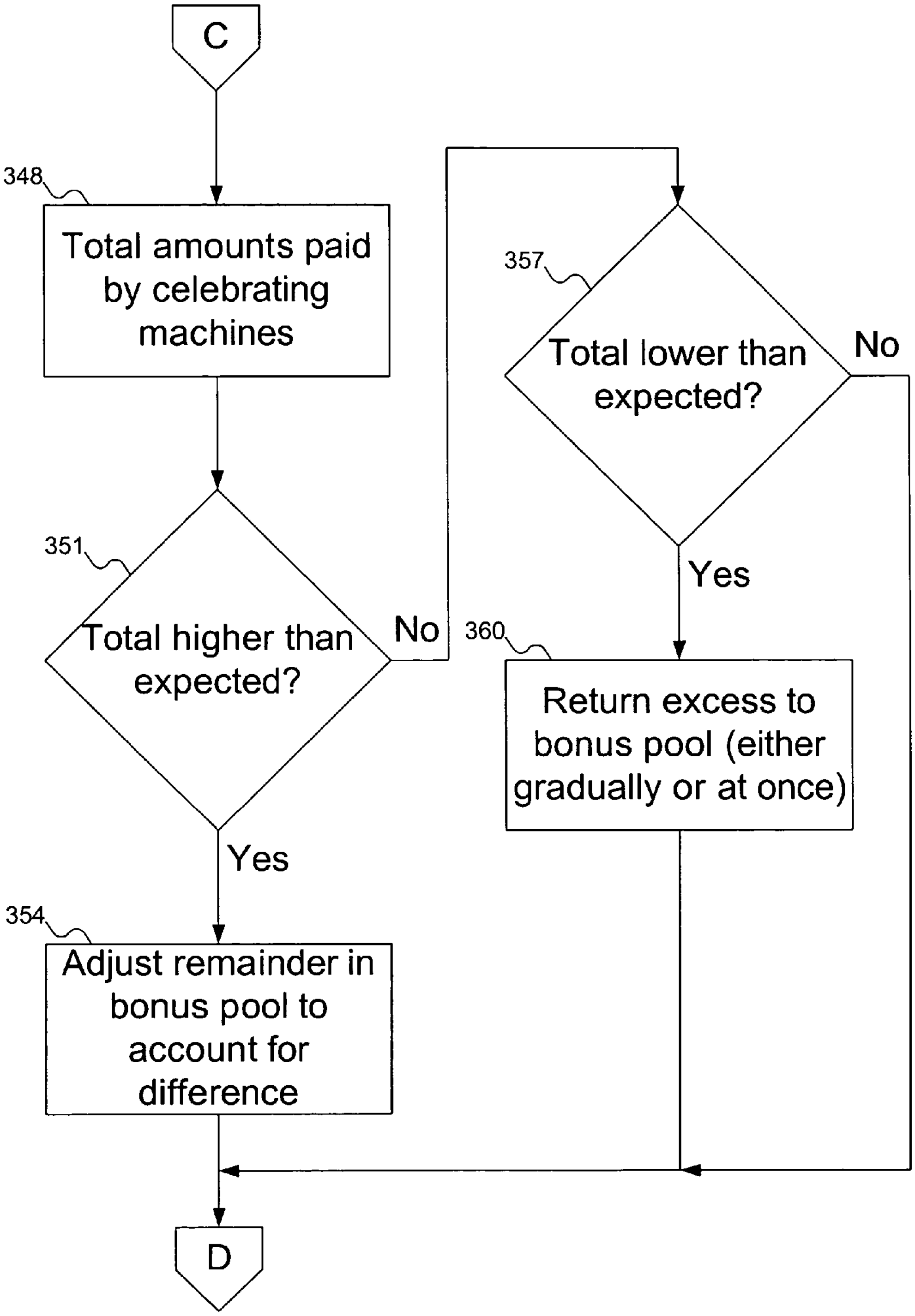

FIGS. 3A-3D show a flowchart of the operation of the bonus controller of FIG. 3 to award celebration pay, according to an embodiment of the invention. In FIG. 3A, at step 303, the gaming machines that are participating in the bonus promotion. Note that step 303 is not the selection of gaming machines that are to receive celebration payouts: step 303 is simply identifying machines that might be eligible later. At step 306, the bonus pool is accumulated. As discussed above with reference to FIG. 3, accumulation of the bonus pool typically involves a percentage of coin-in being directed into the bonus pool. The accumulation in step 306 comes from all participating gaming machines, and can also accumulate from machines that do not participate in the bonus promotion. At step 309, the winning gaming machine is selected. At step 312, the winning gaming machine is paid from the bonus pool. (As discussed above, it can happen that the winning gaming machine is unable to pay the winner for various reasons. In that case, as discussed above, the winning payout is directed to the accounting department for proper disposition.) At step 315, the eligible gaming machines are selected. A person skilled in the art will recognize that this is a preliminary determination of eligible gaming machines, because the gaming machines themselves might later decide individually that they are not eligible. At step 318, the bonus controller determines the celebration amount to be paid by each eligible machine.

At step 321 (FIG. 3B), the bonus controller determines if the celebration amount exceeds the minimum threshold amount. If not, then at step 324, the celebration pay is canceled. Otherwise, at step 327, the bonus controller determines if the celebration pay exceeds the maximum threshold amount. If so, then at step 330, the bonus controller adjusts the celebration amount (e.g., down to the maximum threshold amount). As shown by arrow 333, steps 327-330 are optional, and can be omitted.

At step 336 (FIG. 3C), the bonus controller sends each eligible gaming machine a message indicating the celebration amount. At step 339, the bonus controller receives replies. At step 342, the bonus controller determines if any eligible gaming machines failed to reply. Note that step 342 is not checking to see if the gaming machines paid the celebration amount; step 342 is only interested in whether the eligible gaming machines properly received and processed the celebration pay. If any gaming machines had problems processing the celebration amount, then at step 345, the bonus controller addresses the problems.

At step 348 (FIG. 3D), the bonus controller totals the amounts paid by the eligible gaming machines as celebration pay. At step 351, the bonus controller checks to see if the total amount paid was higher than expected. If so, then at step 354, the bonus controller adjusts the bonus pool to account for the overpayment. Otherwise, at step 357, the bonus controller checks to see if the total amount paid was lower than expected. If so, then at step 360, the bonus controller returns the excess to the bonus pool.

Figure 4A:
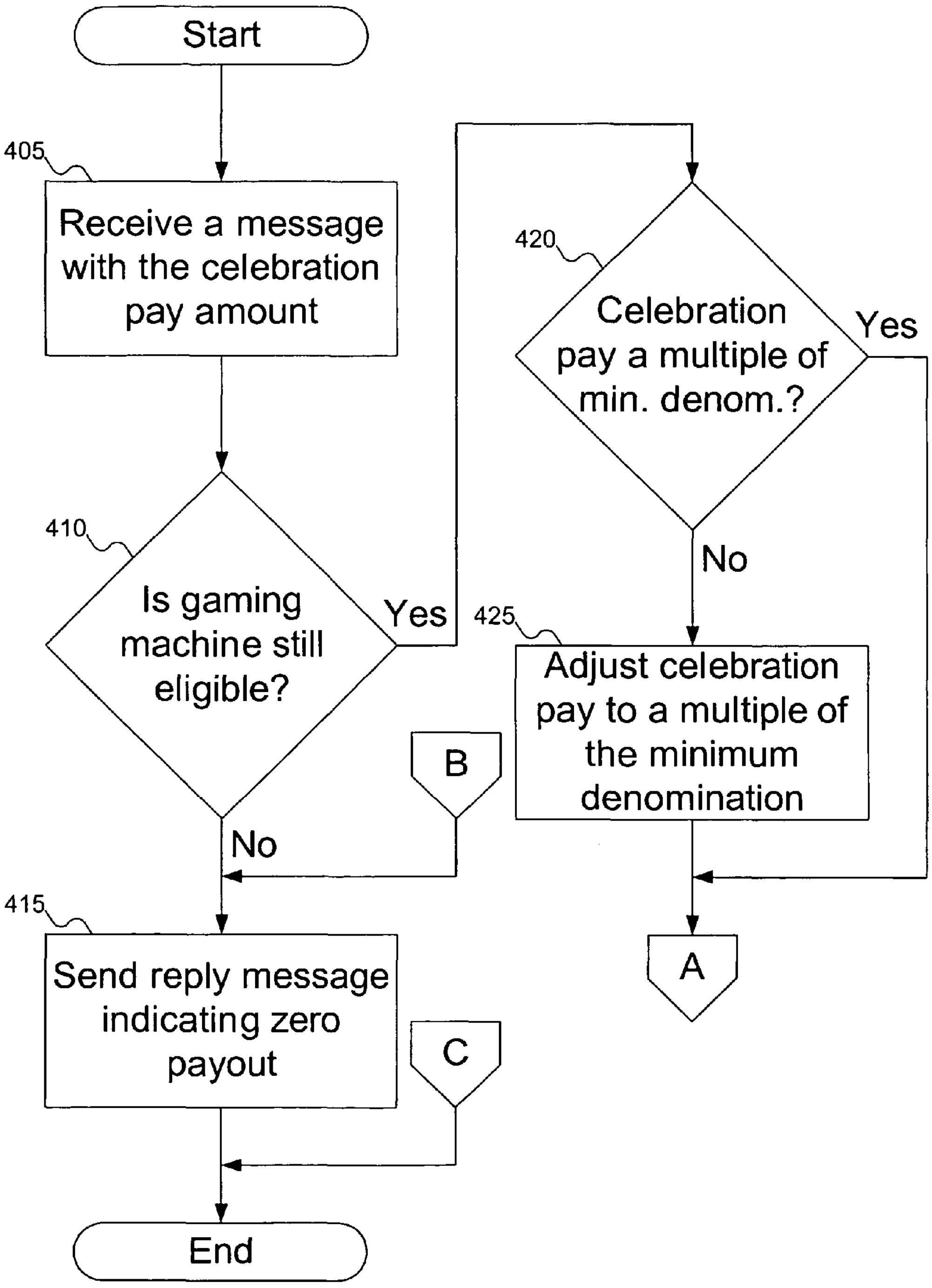
FIGS. 4A-4B show a flowchart of the operation of the gaming devices of FIG. 3 to award celebration pay, according to an embodiment of the invention.
Figure 4B:
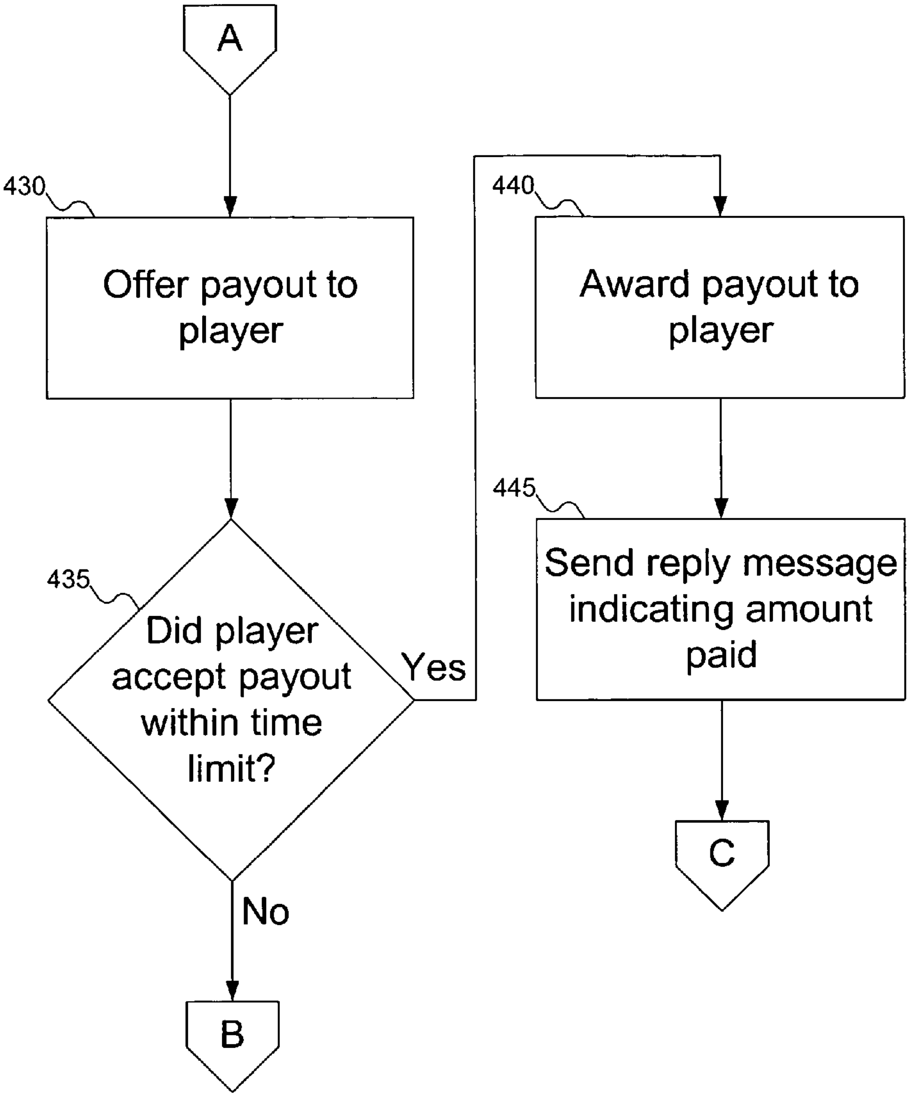

FIGS. 4A-4B show a flowchart of the operation of the gaming devices of FIG. 3 to award celebration pay, according to an embodiment of the invention. In FIG. 4A, at step 405, the gaming device receives a message with the celebration amount from the bonus controller. At step 410, the gaming device verifies that it is still eligible. If not, then at step 415, the gaming device sends a message to the bonus controller reporting a zero payout. Otherwise, at step 420, the gaming device checks to see if the celebration amount is a multiple of the minimum denomination used by the machine. If not, then at step 425, the gaming device adjusts the celebration amount to a multiple of the gaming device's minimum denomination (that is, an amount that can be paid by the gaming device).

At step 430 (FIG. 4B), the gaming device offers the payout to the player. At step 435, the gaming device checks to see if the player accepted the payout in time. If not, then control returns to step 415 in FIG. 4A to report a zero payout. Otherwise, at step 440, the gaming device pays the player, and at step 445 the gaming device reports to the bonus controller the amount paid.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Aside from specially-designed gaming machines, other exemplary machines include computing devices such as personal computers, workstations, servers, portable computers, handheld devices, telephones, and tablets.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 802.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles. And though the foregoing discussion has focused on particular embodiments, other configurations are contemplated. In particular, even though expressions such as "in one embodiment" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention.

The invention claimed is:

1. A method for awarding a bonus promotion using celebration pay, wherein the celebration pay includes a portion of a bonus pool that is divided among non-winning gaming devices comprising:

identifying, by a bonus controller communicatively coupled to a plurality of gaming machines, a first subset of said plurality of gaming machines eligible to participate in the celebration pay;

selecting by the bonus controller one of the gaming machines within the first subset of gaming machines as a winning gaming machine;

dividing a bonus pool into a winning payout, a reserve, and a remainder, the bonus pool is used to pay bonuses payable according to rules that are independent of the individual gaming machines;

paying the winning gaming machine the winning payout from the bonus pool;

determining a second subset of the gaming machines as celebration machines wherein the second subset of gaming machines is selected from the first subset of gaming machines;

determining a celebration amount by dividing the remainder from the bonus pool among each of the celebration machines;

comparing the celebration amount to a minimum threshold;

determining by each of the celebration machines whether it is still eligible for celebration pay;

returning the celebration amount to the bonus pool for each celebration machine that determines it is no longer eligible to receive celebration pay;

paying the celebration amount to each of the celebration machines that are still eligible for celebration pay and if the celebration amount is above the minimum threshold by sending a first message to each of the celebration machines, the message including the celebration amount; and receiving a second message from each of the celebration machines indicating that the celebration amount was paid to the celebration machine or returning an excess of a total celebration amount to the bonus pool if the total celebration amount paid is determined to be less than expected.

2. A method in accordance with claim 1, wherein receiving a second message includes receiving the second message from one of the celebration machines that the one of the celebration machines was no longer eligible to receive the celebration pay.

3. A method in accordance with claim 1, wherein receiving a second message includes receiving the second message from one of the celebration machines that a player did not accept the celebration pay within a specified window of time.

4. A method in accordance with claim 1, wherein returning the celebration amount includes returning the celebration amount from the one of the celebration machines to the bonus pool at one time.

5. A method in accordance with claim 1, wherein returning the celebration amount includes returning the celebration amount from the one of the celebration machines to the bonus pool gradually over time.

6. A method in accordance with claim 1, wherein paying the celebration machines includes adjusting the share of the remainder from the bonus pool to a multiple of a minimum denomination accepted by one of the gaming machines.

7. A method in accordance with claim 1, wherein determining a subset of the gaming machines as celebration machines includes selecting for the subset of the gaming machines, all gaming machines being used by carded players around the time the winning gaming machine is selected.

8. A method in accordance with claim 1, wherein paying the celebration machines includes paying the celebration machines each the share of the remainder from the bonus pool only if the share of the remainder from the bonus pool exceeds a minimum threshold amount.

9. A method in accordance with claim 1, wherein paying the celebration machines includes adjusting the share of the remainder from the bonus pool to a maximum threshold amount if the share of the remainder from the bonus pool exceeds the maximum amount.

10. A method in accordance with claim 1, wherein determining a subset of the gaming machines as celebration machines includes determining the subset of the gaming machines as celebration machines at the time the winning gaming machine is selected.

11. A method in accordance with claim 1, further comprising:

receiving messages from the celebration machines, each message including an amount paid;

totaling the amount paid from the messages; and if the amount paid exceeds the remainder from the bonus pool, adjusting a future celebration pay by a difference between the amount paid and the remainder from the bonus pool.

12. A method in accordance with claim 1, further comprising determining the venue of the winning gaming machine and the celebration machines, wherein the first subset of gaming machines is located within multiple casinos.

* * * * *